Figure 1:
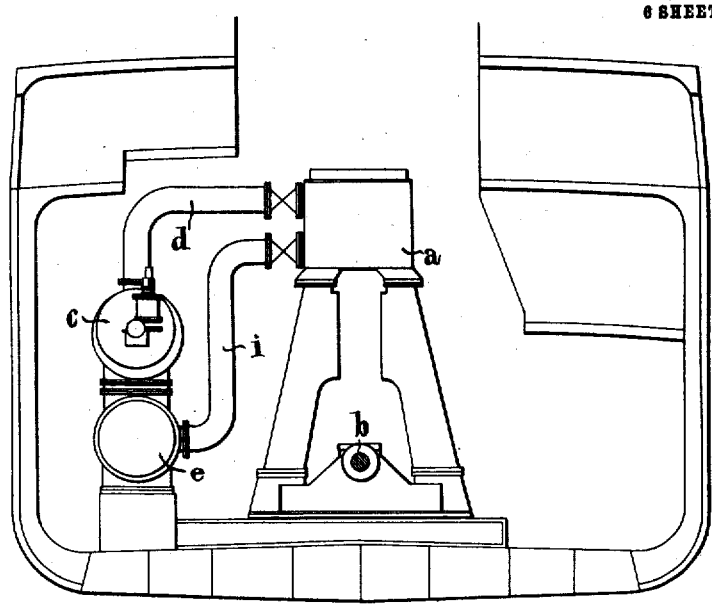

C. A. PARSONS.
SHIP PROPULSION SYSTEM.
APPLICATION FILED APR. 29, 1907.

902,996.

Patented Nov. 3, 1908.
6 SHEETS—SHEET 1.

Attest:
Ed'd L. Folson.
Bent. M. Stahl.

Inventor:
Charles Algernon Parsons,
by Spear, Middleton, Donaldson & Spear.
Att'ys.

C. A. PARSONS.
SHIP PROPULSION SYSTEM.
APPLICATION FILED APR. 29, 1907.

902,996.

Patented Nov. 3, 1908.
6 SHEETS—SHEET 2.

Attest:
Eud L Folson
Benth Stahl

Inventor:
Charles Algernon Parsons,
by Spear, Middleton, Donaldson & Spear
Attys.

C. A. PARSONS.
SHIP PROPULSION SYSTEM.
APPLICATION FILED APR. 29, 1907.

902,996.

Patented Nov. 3, 1908.

6 SHEETS—SHEET 3.

C. A. PARSONS.
SHIP PROPULSION SYSTEM.
APPLICATION FILED APR. 29, 1907.

902,996.

Patented Nov. 3, 1908.
6 SHEETS—SHEET 5.

Attest:
*[signatures]*

Inventor:
Charles Algernon Parsons,
by Spear, Middleton, Donaldson & Spear
Attys.

C. A. PARSONS.
SHIP PROPULSION SYSTEM.
APPLICATION FILED APR. 29, 1907.

902,996.

Patented Nov. 3, 1908.
6 SHEETS—SHEET 6.

Attest:
Rud L Tolson
Bent M Stahl

Inventor:
Charles Algernon Parsons,
by Spear, Middleton, Donaldson &c
Attys.

UNITED STATES PATENT OFFICE.

CHARLES ALGERNON PARSONS, OF NEWCASTLE-UPON-TYNE, ENGLAND.

SHIP-PROPULSION SYSTEM.

No. 902,996.

Specification of Letters Patent.

Patented Nov. 3, 1908.

Application filed April 29, 1907. Serial No. 370,836.

*To all whom it may concern:*

Be it known that I, the Honorable CHARLES ALGERNON PARSONS, a subject of the King of Great Britain and Ireland, residing at Heaton Works, Newcastle-upon-Tyne, in the county of Northumberland, England, have invented certain new and useful Improvements in and Relating to Ship-Propulsion Systems, of which the following is a specification.

This invention relates to the propulsion of moderate and slow speed vessels with single, twin or more screws. Such vessels are at present universally driven by reciprocating engines and the object of the present invention is to increase the efficiency of propulsion by utilizing the energy in the exhaust steam on its way to the condenser in a satisfactory manner by means of turbines so as adequately to assist the reciprocating engines.

The problem indicated above is of particular importance in the case of the ordinary tramp steamer and is then, moreover, of particular difficulty on account of the unsuitability of turbines as at present known for the direct drive of such slow speed vessels.

The invention consists in employing one or more turbines running at relatively high speeds and working with the exhaust steam from the reciprocating engines, the high speed turbine and the low speed propeller shaft or shafts being dynamically connected in a manner enabling both turbines and reciprocating engines to work at speeds compatible with a high efficiency.

The invention consists more specifically in a ship propulsion system of the type indicated in the preceding paragraph having the following preferred forms of transmission: (*a*) electric transmission by means of a high speed dynamo and a low speed motor; (*b*) special worm gearing; (*c*) multiple chain gearing with equalized tensions and, (*d*) multiple helical gear with equalized tensions.

Figure 3:
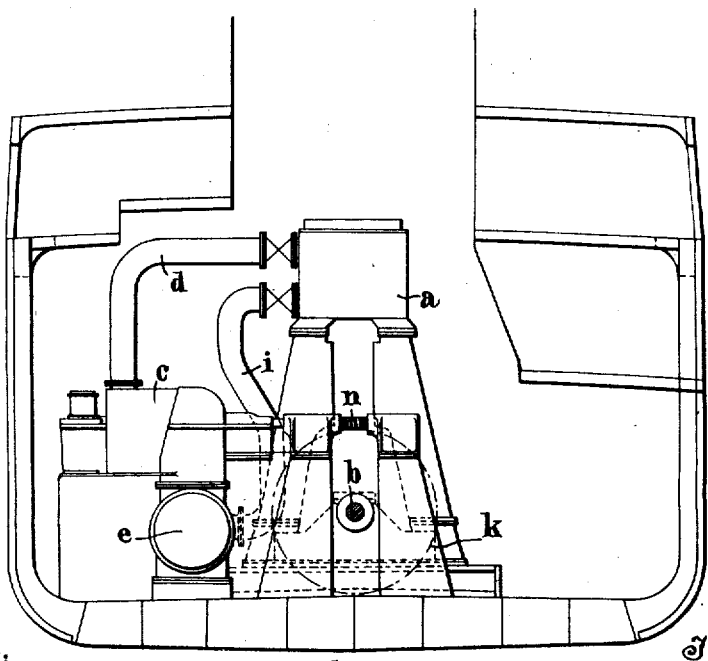
Figure 2:
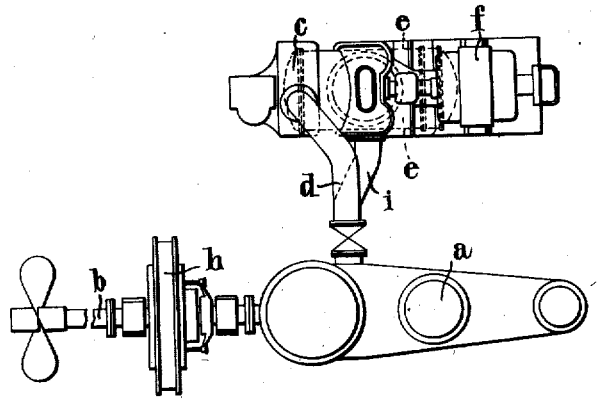
Figure 4:
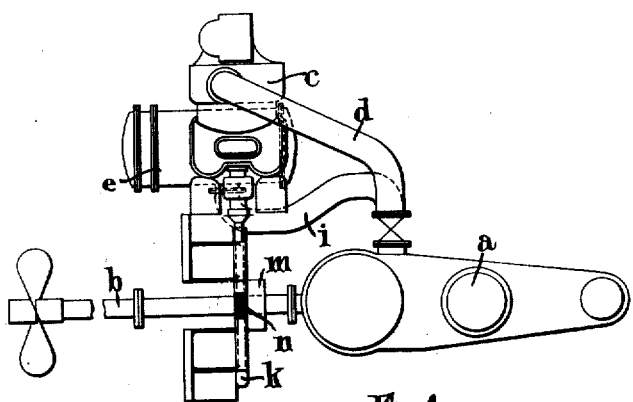
Figure 5:
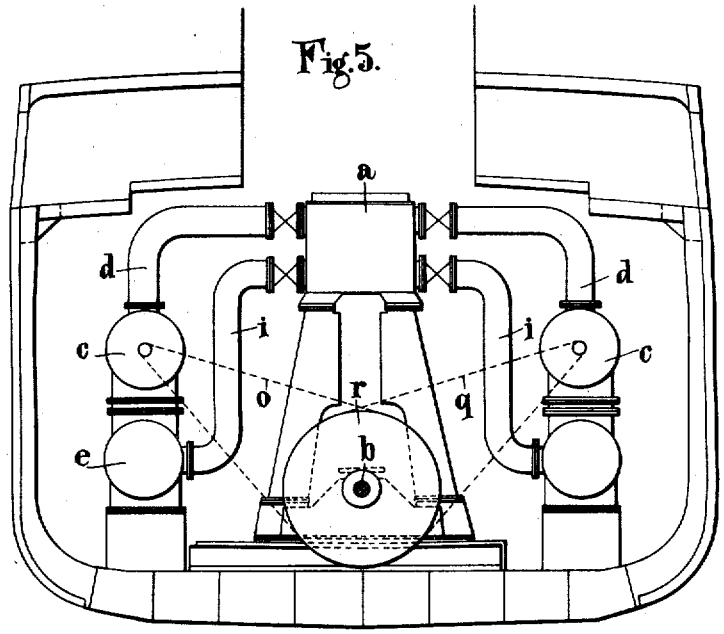
Figure 9:
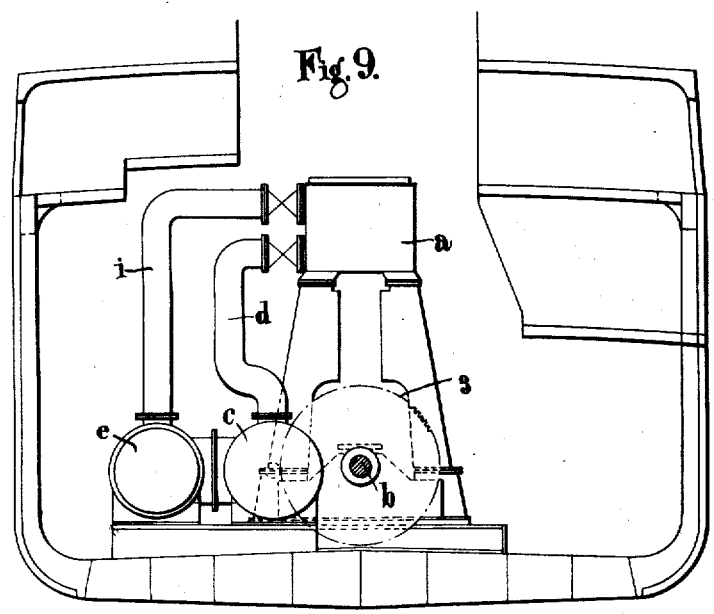
Figure 6:
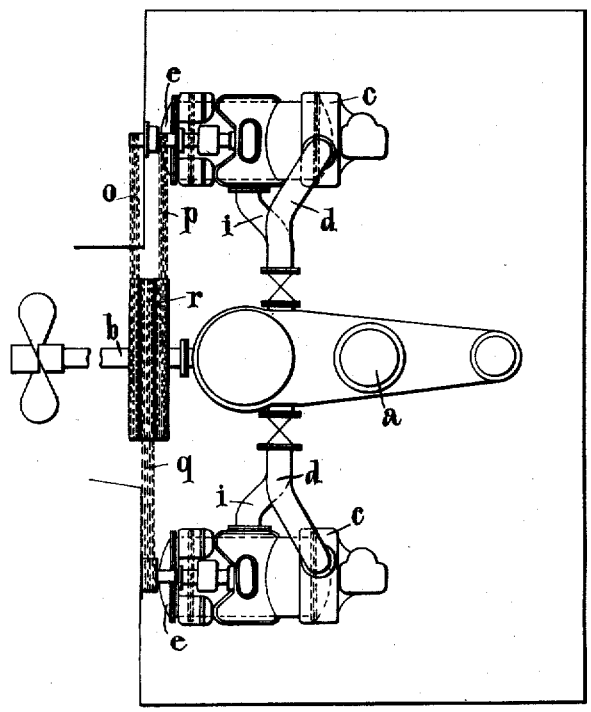
Figure 10:
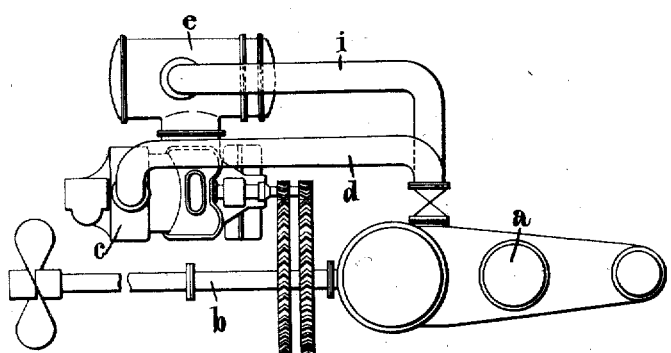
Figure 13:
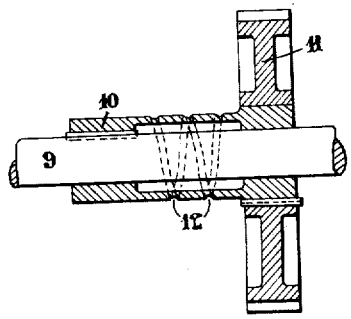
Figure 14:
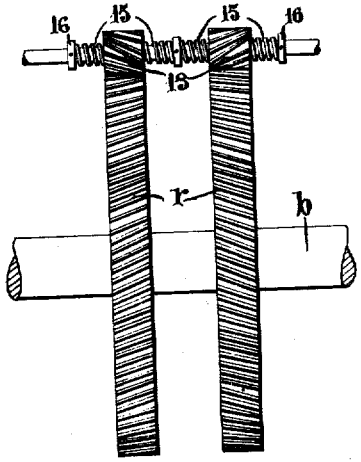
Figure 11:
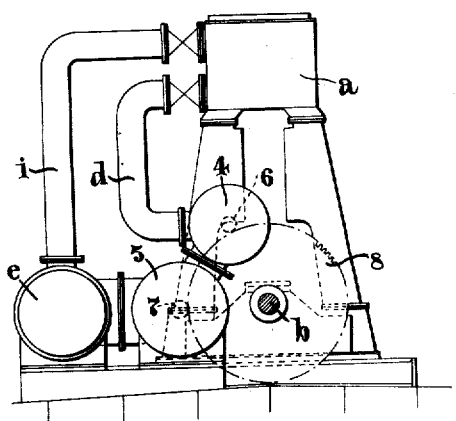
Figure 15:
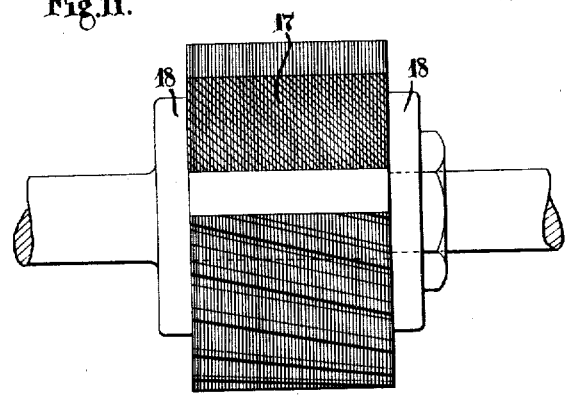
Figure 16:
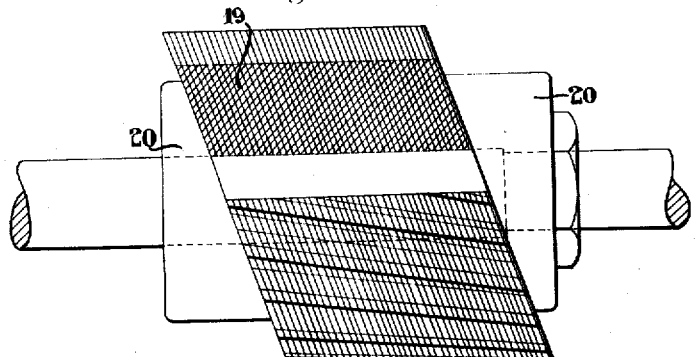

Referring to the accompanying drawings which illustrate my invention and form part of the specification, Figures 1 and 2 show end view and plan respectively of one form of the invention in which electric transmission of power between the high and low speed shafts is adopted; Figs. 3 and 4 are similar views of a modified form of the invention employing worm gearing, while Figs. 5 and 6 are similar views showing the application of multiple chain gear with equalized tensions, Fig. 7 being a side view to an enlarged scale, and Fig. 8 a corresponding cross section on the line 8—8 of one of the chain wheels; Figs. 9 and 10 show end view and plan respectively of a form of multiple helical gearing with equalized tensions. Fig. 11 shows a form of the invention in which the turbine is divided into two parts arranged in series as regards the exhaust steam, Fig. 12 being similar but with the individual turbines arranged in parallel; Fig. 13 shows a form of spring drive in which the required resilience is obtained from the torsion of a hollow shaft; Fig. 14 shows a form of balanced single helical gearing with spring driven pinions, while finally, Figs. 15 and 16 show forms of laminated gear-wheels.

The same reference symbols where desirable are used to denote corresponding parts in the different drawings, which are to a large extent of a diagrammatic nature.

In carrying the invention into effect according to one form as applied by way of example to an ordinary tramp steamer, (see Figs. 1 and 2) reciprocating engines, *a*, of the type now usual running at from 60 to 80 revolutions per minute drive the propeller shaft, *b*, and I provide a high speed turbine, *c*, (or more than one if desired) receiving exhaust steam from the main engines by way of the exhaust pipe, *d*, and discharging into a suitable condenser, *e*. I then mount on the turbine shaft a high speed electric generator, *f*, and lead the current generated thereby to a low speed and preferably multipolar electric motor, *h*, with its rotor mounted on the propeller shaft, *b*. The energy extracted from the main engine exhaust by the turbine is thus transmitted electrically to assist in driving the propeller shaft. I may conveniently arrange an exhaust pipe, *i*, direct from the main engines to the condenser, *e*, so that the turbine can be by-passed and thus put out of action when the main engines are reversed or whenever desirable.

In consequence of the uneven turning moment of the reciprocating engines, in some cases special precautions may have to be taken to insure satisfactory working. In such a case the motor or generator, or both, may be so designed that small variations of speed give little variation of power; for instance, they may be designed with very falling characteristics, and in the case of an induction motor the slip may be considerable. Also suitable switches, resistances, capacities and so forth may be used as required in conjunction with the generator and motor, and these may if preferred, be regulated automatically by a governor or by the steam pressure in the cylinders of the reciprocating engines or by the position of the cranks, so as to give an even or an approximately even load on the electric gearing. It will readily be seen that either continuous or alternating current may be adopted.

According to a modification of the invention in which I use worm transmission gear (see Figs. 3 and 4) I mount a suitable wormwheel, $k$, loosely on the main engine shaft or preferably on an extension thereof and I arrange a suitable hydraulic or other clutch, $m$, so that I may readily connect or disconnect the worm-wheel and main shaft. The worm, $n$, gears preferably with the upper part of the worm-wheel, $k$, and I arrange horizontally the transverse worm-shaft on which the turbine, $c$, is mounted, so that all the running parts that require attention may be readily accessible from the engine-room floor. When reversing the turbine may be disconnected from the main shaft by means of the clutch, $m$, above mentioned; the clutch may also be taken out to avoid difficulties introduced by racing in a heavy sea.

According to another modification, (see Figs. 5 and 6) I may employ a multiple chain transmission from the high speed to the low speed shafts. In the example shown, two turbines, $c, c$, are adopted and the chains are arranged in three groups $o$, and $p$, on the port side counterbalancing, $q$, on the starboard, each group consisting of any suitable number of individual chains. Some or all of the chain wheels, $r$, are connected to their respective shafts through spring drives in such a way that the tension is equalized between the various groups. A side view and section of one form of such chain wheels are shown on an enlarged scale in Figs. 7 and 8. The inner and outer parts of the wheel $s$ and $t$, respectively are mounted after the manner of the ordinary eccentric pulley and strap, so as to be capable of relative angular motion. Both parts are preferably made in halves, which in the case of the inner part may be united by bolts $u$ and in the case of the outer part by studs and nuts, $v$. The inner part carries a series of lugs or brackets, $w$, alternating and having an operative part in line with similar lugs or brackets, $x$, carried by the outer part and between adjacent lugs, suitable springs, $z$, are arranged preferably in compression.

Figure 7:
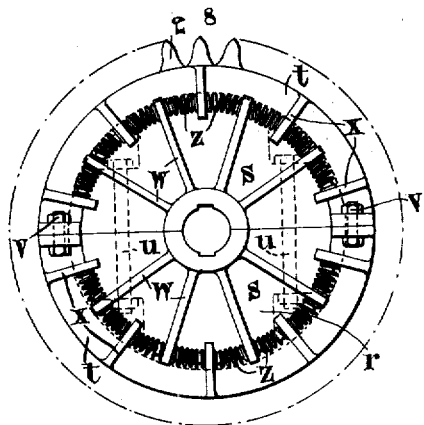
Figure 8:
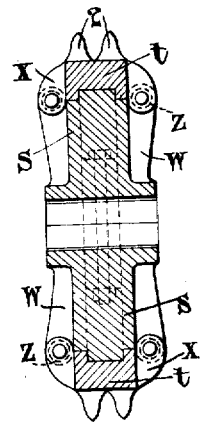
Figure 12:
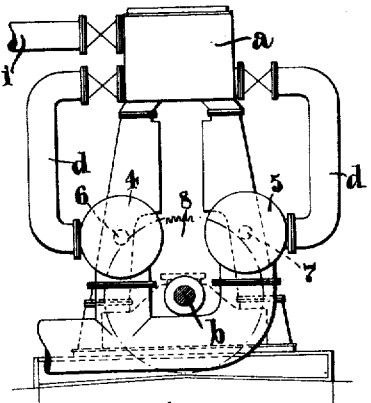

The wheel described in the preceding paragraph with reference to Figs. 7 and 8 is shown provided with teeth, 2, for two chains but any other suitable number of chains may be provided for. Again in some cases (see Figs. 9 and 10) I may use multiple helical gearing, 3, 3, preferably of the chevron-tooth type and render such gearing practicable when there is one exhaust turbine, by spring drives (such, for example, as those above described) either on the pinions or the driven wheels or if the turbine is divided into several elements, such as 4, 5, whether in series as regards the steam as shown in Fig. 11 or in parallel as shown in Fig. 12, there may be several corresponding pinions, 6, 7, driving on to one wheel, 8, or there may be a separate pinion and wheel for each turbine the main end in view being the reduction of the power transmitted through say one gear and an equalization of the power transmitted among the individual gears. In any of the gears I may use a spring drive in order to accommodate any irregularities in the teeth or centering of the pinions and wheels or to prevent racking stresses due to the uneven turning velocity of the main engines; for mechanical reasons, I generally prefer to place this spring drive between the pinion and its shaft, though I sometimes place it on the main shaft, or I may combine both arrangements.

According to another form the torsional deflection of shafts may be employed. Thus referring to Fig. 13, the shaft, 9, from or to which power is to be transmitted, is surrounded by a hollow shaft or sleeve, 10, keyed at one end to the shaft, 9, and carrying at the other the gear wheel, 11, the length of this sleeve, 10, being sufficient to give the required resilience or a helical groove, 12, for example may be cut in it.

When helical gearing of the single type such as is shown in Fig. 14 is used, it is preferable to have an even number of pinion wheels, 13, half of which are right handed and half lefthanded, so that the main shaft, $b$, is not subjected to any extra end thrust. In such an arrangement the pinions, 13, may be restrained to rotate with their shaft, 14, by suitable feathers their endwise sliding being controlled by springs such as 15, butting against the collars, 16. In some cases I cut the pinions or wheels on blanks, 11, (see Fig. 15) composed of sheets of metal or other suitable material, the thickness of such disks or rings depending on the pitch and helical angle of the teeth and the desired elasticity. In this construction the elasticity in angular displacement being secured by the deflection of the disks in a direction normal to their planes, the disks or rings may be clamped close together by the side plates, 18, for example, but I prefer to allow the same individual freedom by interposed washers of smaller diameter. According to a modification of this form of wheel, (see Fig. 16) the individual disks, 19, may be set at an angle as shown, in which case the clamping plates, 20, should be made wedge-shaped; this has the advantage of equalizing the wear on the driven wheel.

Instead of the plates being flat as shown, they may be dished, cupped, corrugated, ridged or shaped in any other desired way to give flexibility and also equalize wear.

I often prefer to place the gear at one or more of the nodal points on the shaft or shafts between the reciprocating engines and the propeller so that torsional vibrations, whether synchronous or otherwise, will not affect the gear.

I may adapt any of the hereinbefore described arrangements, modified where desirable, to vessels having more than one screw and in such a case I may sometimes gear an exhaust turbine to the shaft of a set of engines other than that from which the particular turbine received steam.

I also wish it to be understood that although with a view to reducing the number and complexity of the figures, I have shown the series and parallel arrangements of duplicate turbines in connection with helical gearing only and spring drives in connection with certain forms of gearing only, I may nevertheless adopt any other combination of such elements when practicable and desirable without exceeding the scope of my invention, thus for instance I may provide the worm or worm-wheel or both with a spring drive or they may be made with elastic plates as above described.

I find that by the addition of a high speed exhaust turbine arranged in one of the ways hereinbefore described to assist the main engines, the practical difficulties hitherto hindering the application of the turbine to slow speed vessels are overcome and I am able to increase the power efficiency of the vessel by about 20 per cent.

Having thus described my invention what I claim as new and desire to secure by Letters Patent is;—

1. A ship propulsion system comprising in combination a propeller shaft, reciprocating engine means connected to said propeller shaft, a separate shaft, turbine means on said separate shaft and receiving working fluid from said reciprocating engine means together with means for transmitting power from said separate turbine shaft to said propeller shaft.

2. A ship propulsion system comprising, in combination, reciprocating engine means and a turbine means; a propeller and means for transmitting power from said reciprocating engine and said turbine to said propeller, said transmitting means including a resilient member acting to compensate for inequalities in the turning moment of said reciprocating engine.

3. A ship propulsion system comprising in combination, propeller means; reciprocating engine means and turbine means receiving working fluid therefrom to drive said propeller means and means for gearing said reciprocating engine means and said turbine means together.

4. A ship propulsion system comprising, in combination propeller and shaft means; reciprocating engine means and turbine means receiving working fluid therefrom to drive said propeller and shaft means and means for gearing said reciprocating engine means and said turbine means together, said gearing means being balanced as regards the distribution within the gearing of torsional stresses on said shaft means.

5. A ship propulsion system comprising, in combination propeller means; reciprocating engine means and turbine means receiving fluid therefrom to drive said propeller means; a plurality of sets of gearing between said reciprocating engine means and said turbine means together with means for distributing power transmitted by said turbine means among said sets of gearing.

6. A ship propulsion system comprising in combination propeller means reciprocating engine means and turbine means receiving fluid therefrom to drive said propeller means; a plurality of sets of gearing between said reciprocating engine means and said turbine means together with means for equalizing the power transmitted by said sets of gearing.

7. A ship propulsion system comprising, in combination, propeller means reciprocating engine means and turbine means receiving working fluid therefrom to drive said propeller and helical spur gearing connecting said reciprocating engine means and said turbine means together.

8. A ship propulsion system comprising, in combination, a propeller; reciprocating engine means and turbine means to drive said propeller and means for gearing said reciprocating engine and said turbine means together.

9. A ship propulsion system comprising in combination, propeller and shaft means; reciprocating engine means and turbine means to drive said propeller and shaft means and means for gearing said reciprocating engine means and said turbine means together said gearing means being balanced as regards the distribution within the gearing of torsional stresses on said shaft means.

10. A ship propulsion system comprising, in combination propeller means; reciprocating engine means and turbine means to drive said propeller means; a plurality of sets of gearing between said reciprocating engine means and said turbine means together with means for distributing power transmitted by said turbine means among said sets of gearing.

11. A ship propulsion system comprising, in combination propeller means; reciprocating engine means and turbine means to drive said propeller means; a plurality of sets of gearing between said reciprocating engine means and said turbine means together with means for equalizing the power transmitted by said sets of gearing.

12. In a ship propulsion system, the combination of a propeller means for transmitting power thereto, said means including a propeller shaft and gearing mounted thereon and disposed at about a nodal point thereof.

13. A ship propulsion system comprising, in combination, a propeller; and means for driving the same, said means including reciprocating engine means adapted to run at a certain speed and turbine means adapted to run at another speed.

14. A ship propulsion system comprising, in combination a propeller; and means for driving the same said means including reciprocating engine means running at a certain speed suitable for the economical working thereof and turbine means running at a higher speed suitable for the economical working thereof.

In testimony whereof, I affix my signature in presence of two witnesses.

CHARLES ALGERNON PARSONS.

Witnesses:
HENRY GRAHAM DAKYNS, Jr.,
WILLIAM MENZIES JOHNSTON.